US012676145B2

(12) United States Patent (10) Patent No.: US 12,676,145 B2
Agarwal (45) Date of Patent: Jul. 7, 2026

(54) SYSTEM AND METHOD FOR CONCURRENTLY JOINING VOICE AND WEB CHANNELS

(71) Applicant: ORACLE INTERNATIONAL CORPORATION, Redwood Shores, CA (US)

(72) Inventor: Ashish Agarwal, Longmont, CO (US)

(73) Assignee: Oracle International Corporation, Redwood Shores, CA (US)

( * ) Notice: Subject to any disclaimer, the term of this patent is extended or adjusted under 35 U.S.C. 154(b) by 439 days.

(21) Appl. No.: 18/199,487

(22) Filed: May 19, 2023

(65) Prior Publication Data

US 2024/0386884 A1 Nov. 21, 2024

(51) Int. Cl.
| | |
|---|---|
| *G10L 15/00* | (2013.01) |
| *G06F 16/954* | (2019.01) |
| *G10L 15/18* | (2013.01) |
| *G10L 15/26* | (2006.01) |
| *H04L 51/02* | (2022.01) |
| *H04L 65/1093* | (2022.01) |
| *H04L 67/50* | (2022.01) |

(52) U.S. Cl.
CPC ........ *G10L 15/1822* (2013.01); *G06F 16/954* (2019.01); *G10L 15/26* (2013.01); *H04L 51/02* (2013.01); *H04L 65/1093* (2013.01); *H04L 67/535* (2022.05)

(58) Field of Classification Search
CPC .. H04M 7/0057; H04M 3/5166; H04M 3/523; H04M 3/5191; G10L 15/1822; G10L 15/26; G06F 16/954; G06F 16/951; H04L 67/535; H04L 51/02; H04L 65/1093; H04L 65/1069; H04L 67/02

USPC .......................................................... 704/257
See application file for complete search history.

(56) References Cited

U.S. PATENT DOCUMENTS

| | | | |
|---|---|---|---|
| 10,187,337 B2 | 1/2019 | Smullen et al. | |
| 11,005,997 B1 | 5/2021 | Deegan et al. | |
| 2002/0059378 A1* | 5/2002 | Mustafa | .............. H04L 65/1069 |
| | | | 709/205 |

(Continued)

OTHER PUBLICATIONS

Patent Cooperation Treaty (PCT): International Search Report and Written Opinion for PCT International Application No. PCT/US24/25321, (International Filing Date: Apr. 19, 2024), having a date of mailing of Aug. 13, 2024 (9 pgs).

*Primary Examiner* — Md S Elahee
(74) *Attorney, Agent, or Firm* — Kraguljac Law Group, LLC

(57) ABSTRACT

Systems, methods, and other embodiments associated with concurrently joining voice channels and web channels are described. In one embodiment, a method includes establishing a voice session to communicate over an audio channel, wherein a live agent communicates audio voice signals with a user. In response to identifying an issue from the user, transmitting a navigation link wherein the navigation link, when activated, navigates a browser to a web page associated with the issue. A web session is established to communicate between the browser and the web page. The voice session and the web session associated with the user are linked together. A call controller may then communicate simultaneously with both channels since they are connected allowing a live agent to disconnect from the audio channel.

20 Claims, 5 Drawing Sheets

(56)                    References Cited

U.S. PATENT DOCUMENTS

2009/0281966  A1*  11/2009  Biggs ................... G06F 16/951
                                              706/11
2013/0129074  A1     5/2013  Peterson et al.
2015/0207847  A1*   7/2015  Kim ................... H04L 65/1069
                                              709/204
2018/0084111  A1     3/2018  Pirat et al.

* cited by examiner

FIG. 1

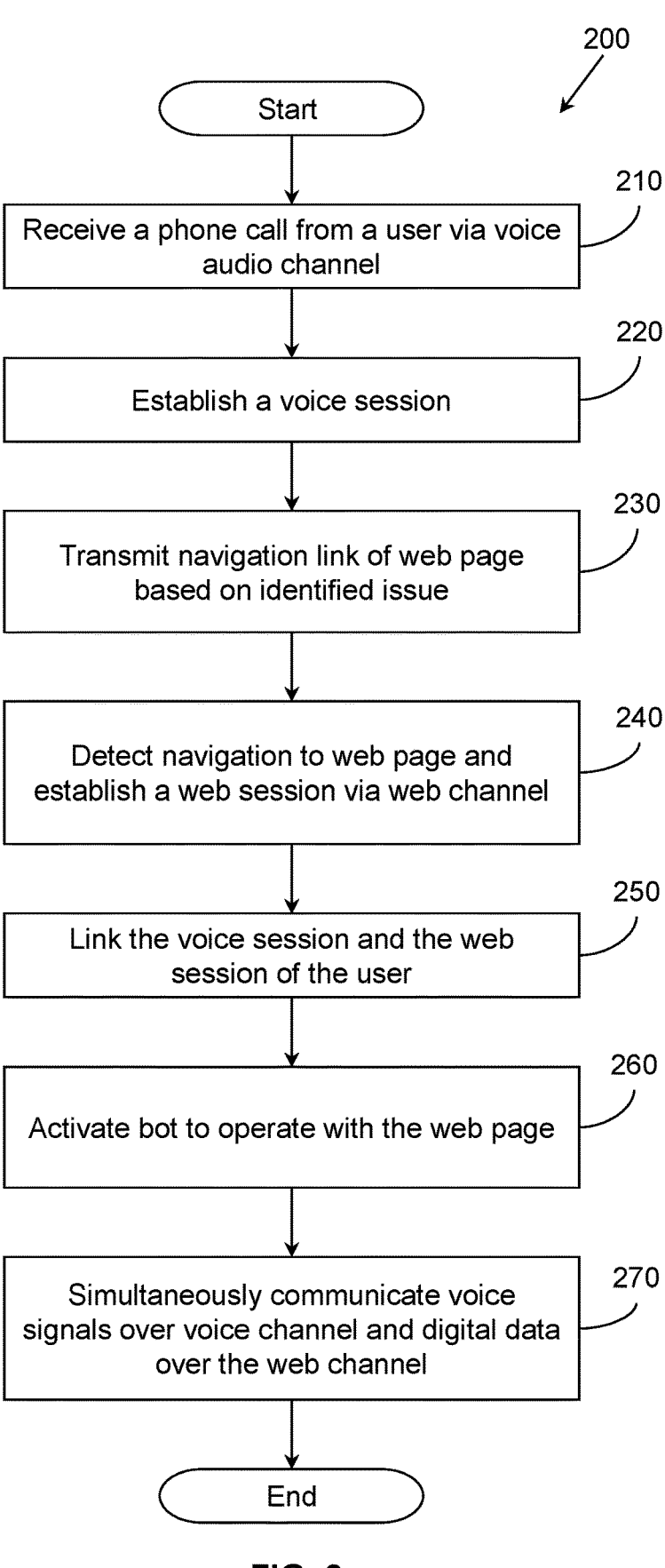

200

Start

Receive a phone call from a user via voice audio channel    210

Establish a voice session    220

Transmit navigation link of web page based on identified issue    230

Detect navigation to web page and establish a web session via web channel    240

Link the voice session and the web session of the user    250

Activate bot to operate with the web page    260

Simultaneously communicate voice signals over voice channel and digital data over the web channel    270

End

FIG. 2

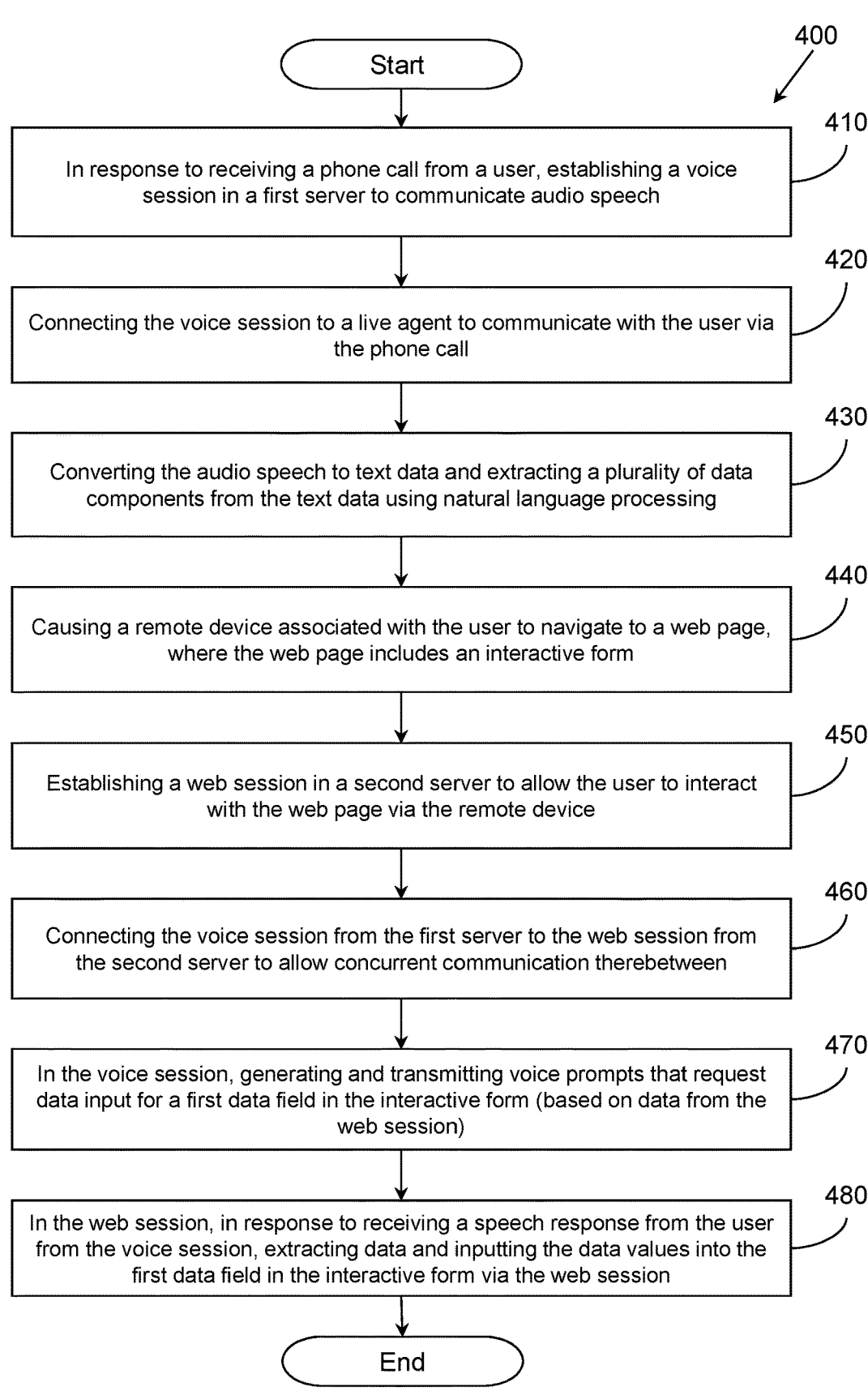

400

Start

410

In response to receiving a phone call from a user, establishing a voice session in a first server to communicate audio speech

420

Connecting the voice session to a live agent to communicate with the user via the phone call

430

Converting the audio speech to text data and extracting a plurality of data components from the text data using natural language processing

440

Causing a remote device associated with the user to navigate to a web page, where the web page includes an interactive form

450

Establishing a web session in a second server to allow the user to interact with the web page via the remote device

460

Connecting the voice session from the first server to the web session from the second server to allow concurrent communication therebetween

470

In the voice session, generating and transmitting voice prompts that request data input for a first data field in the interactive form (based on data from the web session)

480

In the web session, in response to receiving a speech response from the user from the voice session, extracting data and inputting the data values into the first data field in the interactive form via the web session End

FIG. 4

SYSTEM AND METHOD FOR CONCURRENTLY JOINING VOICE AND WEB CHANNELS

BACKGROUND

A business or company that provides services and/or products to customers may provide customer service in the form of a customer service call center. A call center is a complex technological system involving servers, database systems, phone systems, sophisticated software applications, as well as live agents to handle phone calls from customers. Live human agents are usually trained to handle calls and answer as many questions as they can as quickly as possible.

The number of live agents in any company are limited and the time of a live agent is a valuable resource. A live agent can only handle a certain amount of phone calls at any given time. Automated systems have been implemented to relieve the use of live agents and handle interactions with customers. Automated chat systems (or chat bots) have been designed to engage with customers by providing human-like responses to customer questions using Natural Language Processing (NLP).

However, many customers are quickly discouraged with automated systems when a chat bot cannot answer their questions or provides incorrect responses. It would be desirable to have a system with real-time functional tools that combine phone calls on voice systems and digital tools on web systems to reduce resources of a call center system and improve handling of phone calls.

SUMMARY

In one embodiment, a computer-implemented method is described that includes receiving, by a voice server, a phone call from a user; establishing a voice session to communicate over an audio channel, wherein a live agent communicates audio voice signals with the user over the audio channel; in response to identifying an issue from the user, transmitting a navigation link to a remote device associated with the user, wherein the navigation link, when activated, navigates a browser on the remote device to a web page associated with the issue; in response to the user navigating to the web page via the navigation link, establishing a web session in a web server that includes a web channel to communicate between the remote device and the web page; automatically linking, by a call controller, the voice session and the web session associated with the user; activating a bot to operate with the web page and monitor at least user actions on the web page, wherein the bot communicates one or more user actions to the call controller; generating and transmitting, by the call controller, audio voice signals with the user over the audio channel based on at least the one or more user actions and simultaneously communicating digital data over the web session to the web page while the user is interacting with the web page.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 1 illustrates one embodiment of a system associated with connecting voice channels and web channels.

FIG. 2 illustrates one embodiment of a method associated with connecting voice channels and web channels during a phone call.

FIG. 4 illustrates an embodiment of a method associated with connecting an independent voice channel and a web channel and inserting voice data into an interactive form.

DETAILED DESCRIPTION

Figure 3:
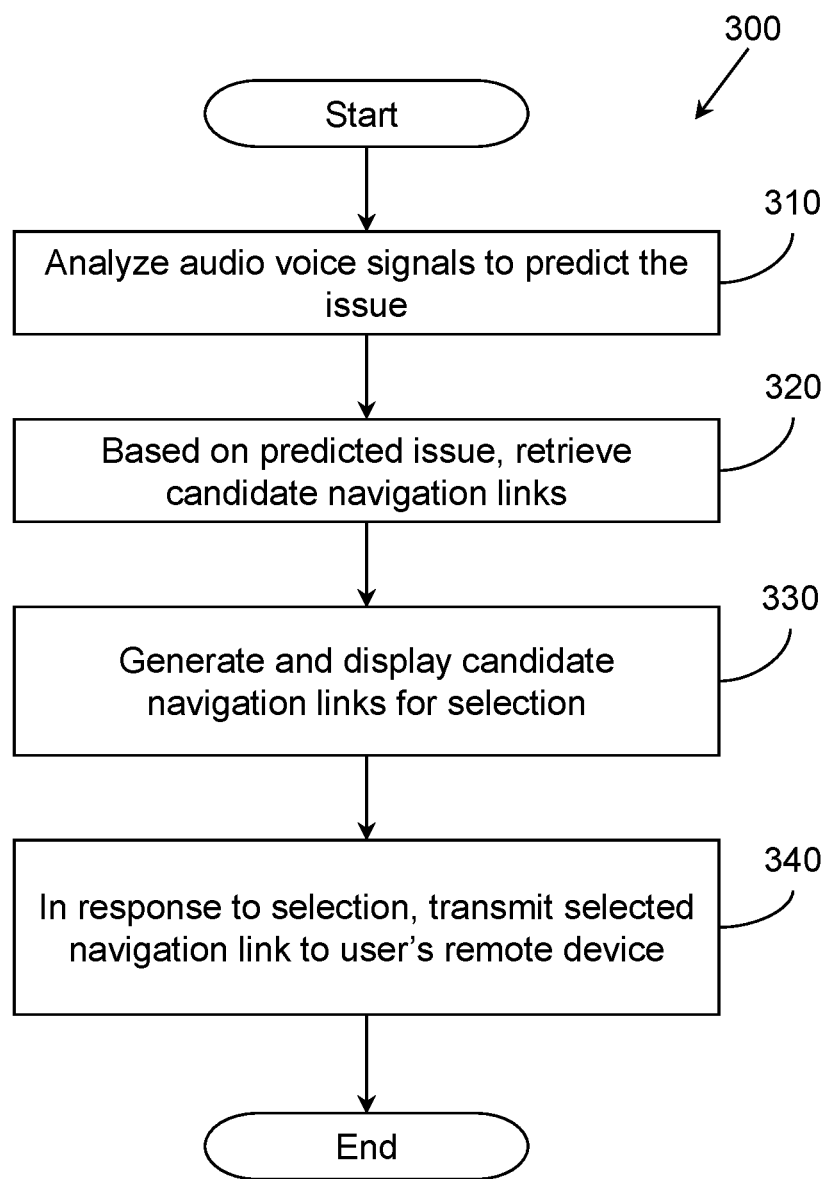
FIG. 3 illustrates one embodiment of a method associated with identifying and generating candidate navigation links.

Systems and methods are described herein that control connections between phone calls on a voice channel and web page access on a web channel. In one embodiment, the present system interconnects phone calls from users to be handled concurrently by automated systems, while the users also interact with a web page on a web channel. For example, the interconnection function of the present system joins the voice channel to the web channel allowing collaborative and coordinated communication on both channels simultaneously to a user.

Previous call systems did not interconnect voice channels and web channels, especially when the two channels are established at different time points. Rather, previous call systems operated the two channels separately and independently from each other resulting in duplicate and/or excessive functionality being implemented and performed. The two separate channels were also not able to collaborate with each other. Other previous systems disconnected or terminated one of the channels and only communicated on one channel, causing limited functionality and performance for interacting with a user. The present system improves these prior systems by joining two independent channels and, in some embodiments, providing additional functional tools in real-time based on predictions made by the system, as discussed herein.

In one embodiment, with the present system, by joining voice and web channels, an automated response system (e.g., a call controller) obtains simultaneous access to both the voice channel and the web channel that are connected to a customer/user. This allows concurrent interaction with the customer/user on both channels. Additionally, for example, phone calls handled by a live customer service agent may be transferred to the call controller thereby reducing resources including the amount of time required by the live agent to be on the phone (e.g., the call handle time).

In one embodiment, the present call control system may be implemented in a call center system that handles customer issues for a corporation (e.g., a utility company, other service company, product company, etc.). A call center at a utility company is a complex technological system involving servers, database systems, phone systems, sophisticated software applications, as well as live agents to handle phone calls from customers. These resources involve large expenses and improving their technology with the present system may reduce complexity and expenses.

Average call handle time is a metric used in the call center industry. Live agents spend a lot of time helping customers to understand their bills, make changes to their accounts, research issues, navigate through complex user interface screens, order products, input information from the customer, all of which occurs as the live agent and customer speak on the phone call.

Research has also shown that customers prefer speaking on phones and are more likely to continue using the voice channel (the phone call) as a means to communicate with a company to resolve issues. The more a customer uses phone calls, the more likely they will use phone calls again for subsequent issues. Thus, migrating these customers to digital channels (e.g., a web channel, web page interface) is a focus of the industry to reduce the call volume.

Research has also shown that customers are typically near a smart device or computer when calling a call center. Thus, the present system implements a mechanism to combine and/or connect the voice channel (phone call) with a digital web channel to either finish a task or at least finish part of a task digitally rather than solely by phone.

In another embodiment, the present system is configured to analyze customer phone conversations to a call center in real time and predict and/or identify a subject matter of the conversation, identify an issue discussed, and/or identify other data. Based on the predicted subject matter or issue, the present system may generate insights, offer functional tools, tips and/or suggested next-best actions (e.g., on a graphical user interface). The generated tools may help a live agent be more productive to reduce the call handle time. The present system may also offer contextually relevant short cuts and/or navigation links to help the live agent complete internal processes more quickly saving time on the phone call in real-time.

Definitions

A "voice channel" as used in one or more embodiments, includes but is not limited to, a communication channel that carries voice/speech data that is in an audio format at a source and destination of the channel. For example, a phone call initiated from one telephone (source) to another telephone (destination) creates a voice channel to communicate voice signals therebetween. Each telephone includes at least a microphone and a speaker for receiving and transmitting voice audio sound as well as network communication functionality. A telephone includes but is not limited to handheld devices or computing devices that make and receive calls via wireless communications, landline communications, combinations of both, or digital IP-based telephone services (e.g., voice over IP technologies). Although a voice channel may include portions of the channel that carry signals in digital form, the input and output of the voice channel includes audio signals.

Figure 1:
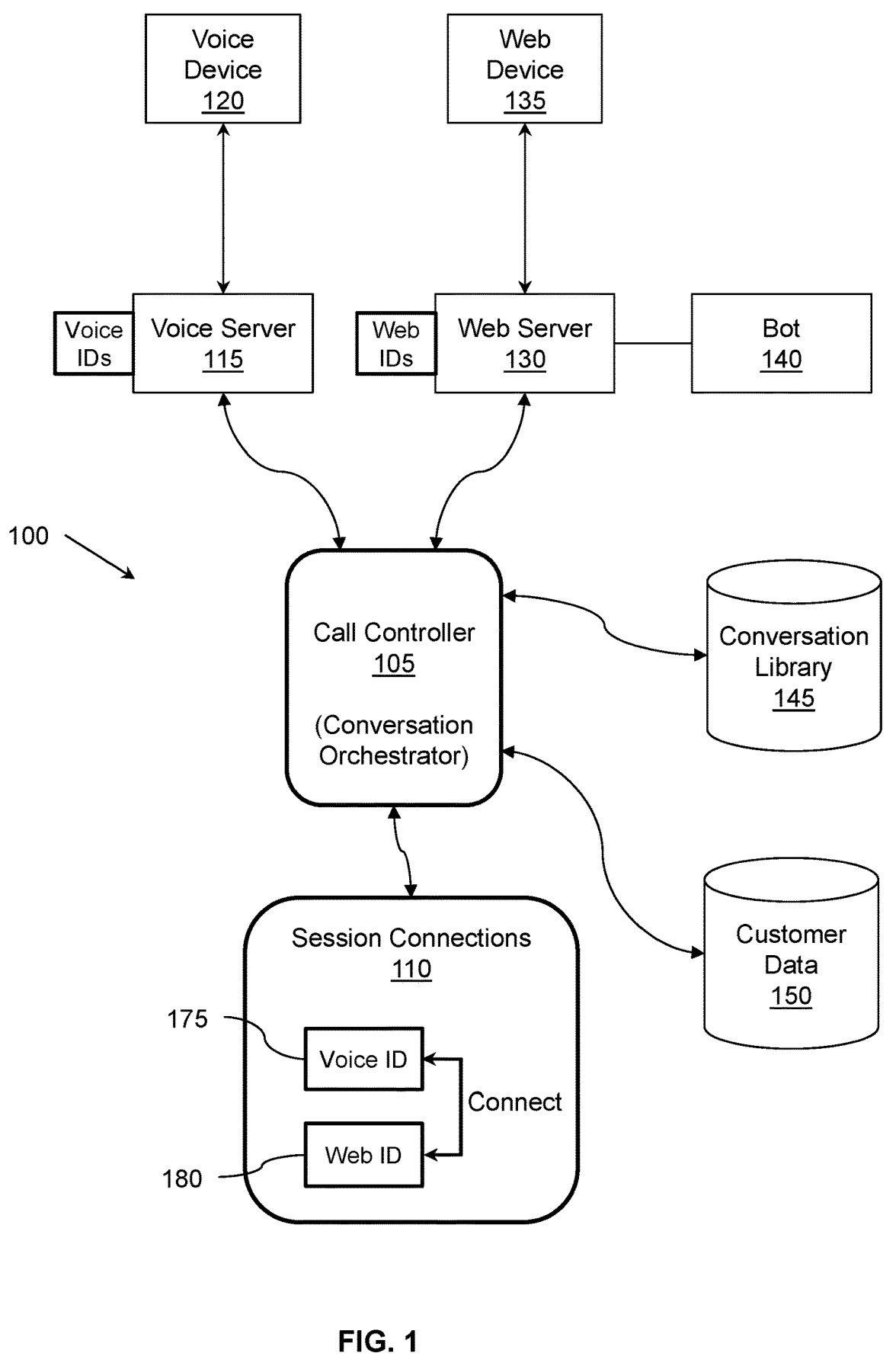

A "web channel" as used in one or more embodiments, includes but is not limited to, a network communication channel that connects one computing device (e.g., a client device) to another computing device (e.g., a server) through network connections that may include multiple network components. The web channel provides digital communications between the two devices. For example, a web channel may provide a remote user device with access to content on a server such as web pages via an internet connection.
System Embodiment With reference to FIG. 1, one embodiment of a call control system 100 associated with controlling connections between phone calls on a voice channel and web page access on a web channel is illustrated. System 100 includes a call controller 105 and session connections 110 that are configured to link or otherwise connect a voice session with a web session for a particular customer/client/user. Similar connections may be established for multiple customers/clients/users for a call center that may have hundreds or thousands of active phone calls at any given time period.

A voice server 115 is configured to handle phone calls to and from voice devices 120 (e.g., client devices, cell phones, etc.). In one embodiment, the voice server 115 is configured to establish a voice session for each phone call that is received by or transmitted from the voice server. Each voice session is assigned to and associated with a voice channel that is assigned to a voice identity/identifier corresponding the voice device 120 (which is associated with a particular user identity or identifier, user ID).

For example, when User 1 makes a phone call using a voice device 120 to a phone number belonging to or handled by the voice server 115, the phone call is received by the voice server 115. A connection is established (e.g., voice channel of the phone call) and it is assigned with a voice session and a voice identity/identifier that uniquely identifies the voice device 120 (e.g., User 1). Each voice session established in the voice server 115 may be identified by, for example, a voice session ID and a unique voice identifier that identifies at least the user and/or their voice channel (e.g., user ID, phone number, etc.). The voice server 115 maintains a list of active voice sessions along with their identifiers (e.g., referred to as voice session data).

A web server 130 is configured to handle internet connections and remote access to the web server 130. The web server 130 is configured to provide and allow clients/users (operating a web device 135) to access web pages controlled by the web server 130. In one embodiment, the web server 130 is configured to establish a web session for an individual remote web device 135 that includes a web channel to communicate between the remote web device 135 and content in the web server 130. This may include accessing a user account and one or more web pages.

Each web session is uniquely assigned to a particular web device 135 and the client/user making the connection to the web server 130. For example, a web identify/identifier may be used to uniquely associate a client/user to a web session to distinguish each user and each web session from other users and web sessions. Each web session established in the web server 130 is identified by a unique web identifier (web ID) that is assigned to at least the user (user ID) and their web channel/session. The web server 130 maintains a list of active web sessions along with their identifiers (e.g., referred to as web session data).

The web device 135 may be any computing device capable of communicating with the internet and/or private communications network. The web device may include, but is not limited to, a smart phone, computer, or any other computing device with network capabilities.

In one embodiment, the web server 130 may be configured to activate a bot 140 during a web session to interact with a particular web device 135. The bot 140 may be an embedded bot and may be selected from a plurality of available bots based on, for example, the type of web page and corresponding functionality of the bot. The bot 140 may be configured to monitor and listen to events that occur on a web page, for example, user actions that occur. The bot 140 may also be configured to automate input and output actions on a web page and communicate with the call controller 105.

In one embodiment, the call controller 105 may include a conversation orchestrator component that may be part of the call controller 105 or operate in conjunction with the call controller 105. The conversation orchestrator component may include applications such as speech recognition technology and natural language processing (NLP) technology to understand and handle voice conversations. The system 100 may also include a conversation library 145 that includes programmed responses that are used to generate corresponding voice prompts and/or actions for web pages based on certain conditions.

For example, based on a type of event or condition that is detected, the call controller 105 may identify a corresponding response that has been defined in the conversation library 145 and generate that response to the user. The library 145 may be programmed with voice prompts that request certain data from a user based on a web page or form that the user is interacting with. For example, a particular web page may have a set of programmed responses that are associated with the content of the web page and/or user actions that occur when a user interacts with the web page.

The conversation library 145 may also be programmed with answers to questions related to content of a web page. For example, for web page XYZ, a programmed responses for a user asking a question about the content, "What is [data field ABC]?" may include a response that describes the content of data filed ABC. This response would be passed back to the call controller 105 to generate a voice response to the user. A database of customer data 150 may be used to personalize the responses and/or actions generated for a particular client/user that is involved in a voice session and/or a web session.

Regarding the session connections 110, the call controller 105 is configured to link and join an independent voice session from the voice server 115 to an independent web session from the web server 130 where both sessions belong to the same client/user. In one embodiment, the session connection may include mapping or assigning a unique voice identity/identifier 175 and a unique web identity/identifier 180 together in a database or other data structure. In this manner, the call controller 105 and other system components can determine which web session belongs to which voice session for a particular user by accessing the database and identifying the joined/linked IDs.

Based on knowing which channels are joined/linked together, this allows, for example, the call controller 105 to communicate audio voice signals with the user over the audio voice channel (over a phone call) and simultaneously communicate digital data over the web session to the web page while the user is interacting with the web page and on the phone call. Thus, the call controller 105 functions as an interconnection that passes communications between both channels for a specific user/customer based on the link. In this manner, the user can view the web page and see actions taken by the call controller 105 and/or the bot 140 (which occurs over the web session) and the user can speak and listen to the call controller 105 over the voice session.

As previously stated, connecting these two independent sessions was not previously performed by previous systems. Thus, the present system provides improved efficiency and collaborative functionality in communications by combining these channels. This will be described in more detail below.

In one example embodiment, the call controller 105 is configured to concurrently connect a voice channel to a web channel in a server. The voice channel is established from a phone call from a user device (via voice device 120) and the web channel is established from a browser navigating to a web page (via web device 135). The phone call and the browser are operated by the same user but are on two independent communication channels. The call controller 105 is configured to identify the two independent communication channels (e.g., the voice session and the web session) that are assigned to the same user and connect the two channels. In one embodiment, the voice session ID and web session ID are connected/linked together in the session connections 110. This allows the call controller 105 to communicate and transfer data to both channels concurrently by knowing which channels belong to the same user. Thus, the call controller 105 may interact with the user with voice responses (via the voice channel) and to interact with content of the web page (via the web channel). This is further described below.

Thus, since the two channels are connected for the same user, the call controller 105 may interact and communicate with both channels simultaneously. For example, the bot 140 may be configured to monitor and detect certain types of user interactions and conditions that occur on the web channel. The interactions may include both actual actions and lack of actions. In response, the bot 140 may communicate the detected user actions and conditions to the call controller 105. The call controller 105 may then determine and retrieve a corresponding response that matches the detected actions/conditions from the conversation library 145, which becomes the basis of a voice response. The call controller 105 may then generate and transmit a voice response simultaneously via the voice channel to provide assistance to the user relating to the content of the web page and/or relating to the type of user interactions detected.

In this manner, the user can enjoy being on the phone call to receive voice responses while the call controller 105 and the bot 140 can also systematically provide assistance over the web channel to resolve the user's issues. One advantage is that a live agent can disconnect from the phone call in response to establishing the web session and/or after transferring the phone call to the call controller 105 and/or bot 140 to reduce call handle time of the live agent.

Additionally, with the present system 100, when implemented in a call center system (e.g., a utility company call center), the system 100 may reduce overall call center expense by providing a set of functional tools in real-time to both a live agent and the customer during a phone call. This will be described below.

Process Embodiment

With reference to FIG. 2, one embodiment of a method 200 is illustrated that is associated with connecting independent voice channels and web channels. Method 200 will also be described with reference to the system 100 of FIG. 1 and with reference to operating in a call center system.

At block 210, the voice server 115 receives a phone call from a user who is using a voice device 120 (e.g., cell phone). When the phone call is answered, a connection is established with the cell phone which creates a voice (audio) channel for communication.

At block 220, a voice session is established in the voice server 115 for the user to communicate over the audio channel. Once established, a live agent may connect to the voice session and communicate audio voice signals (talk via the phone call) with the user over the audio channel.

Typically, the user is calling a company due to some issue the customer is having with their account and/or is looking to perform some task with the company. For example, a utility customer may have moved from their home residence and needs to change their home address and move utility services to their new home address. The live agent is involved to assist the user to accomplish these changes with the internal processes of the company. Upon an initial conversation over the phone, the live agent can identify the customer's issue and reason for the phone call.

In one embodiment, the system may concurrently execute a speech recognition or natural language processing (NLP) application to identify the subject matter of the conversation and other data components associated with the user. This may include collecting and converting the audio voice signals from the phone call to text data, understanding what the text is, and extracting certain pieces of the data automatically. The extracted pieces of data may include, but are not limited to, the customer's name, address, reason for the phone call, etc. By understanding the conversation, the system may then predict what the issue is and assess other parameters such as the customer's sentiment.

One assumption made is that customers are typically near a smart device or computer when calling the call center. Thus, this may be used to leverage a web channel in combination with the phone call (voice channel) for performing tasks to resolve the customer's issue. For example, the live agent and the system attempts to navigate the customer/user to a particular web page or website with a computing device. One objective here is to get the customer to interact with automated system components associated with the webpage so that the live agent can be disconnected from the phone call.

At block 230, in response to identifying the issue from the user, a navigation link may be transmitted to a remote device associated with the user. In one embodiment, the navigation link, when activated (e.g., selected or clicked on by the user), navigates a browser on the remote device to a web page associated with the issue.

For example, based on the customer's issue, the live agent may tell the user that they can fill out a particular form to resolve the issue. In the above example of the customer moving their home address, a change of address form may need to be completed. Here, one objective is to reduce the amount of time the live agent is on the phone call. Thus, rather than the live agent interacting with the customer over the phone call to handle the details, the system will pass the assistance to a bot or other automated response system that is configured to fill out and assist with the form directly with the customer using a web page. Thus, a navigation link is configured that is directed to the particular form on a particular web page within the system (e.g., a web page containing a change of address form).

In one embodiment, based on the customer's issue identified or predicted from the phone conversation by the NPL application, the system may identify one or more tools that correspond to the predicted issue. The one or more tools may then be displayed on a graphical user interface (GUI) on a device operated by the live agent to more quickly resolve the issue. For example, the tools may include candidate navigation links that the system predicts are relevant to particular online forms or other web pages corresponding to the predicted issue. Thus, one or more candidate navigation links may be displayed in a list to the live agent and made available for selection. This is also described with reference to FIG. 3.

The live agent may then select a navigation link from the GUI that the live agent believes is associated with the customer's issue. The live agent may also search for additional links if the correct link is not in the displayed list. After a navigation link is selected (e.g., link to a change of address online form), an electronic message is generated containing the navigation link and addressed to a device associated with the customer.

In one embodiment, the navigation link is transmitted to the user in the electronic message. This may be performed by sending the navigation link in an SMS message to the user, in an email associated with the user, and/or in another electronic format. Upon receiving the message, the user may then activate the navigation link, which will cause the user's device to navigate to the associated web page.

Additionally, since the user's identity may be obtained during the phone call, the navigation link may be configured to include pre-authentication data or other credentials associated with the user. This allows the web server to automatically authenticate the user and log into an account assigned to the user when the navigation link is activated and a web page on the web server is accessed.

With continued reference to FIG. 2, at block 240, in response to the user navigating to the web page via the navigation link, a web session is established in the web server 130 (FIG. 1). As previously explained, the web server 130 is separate from the voice server 115, in one embodiment, and handles website access. The web session may include a web channel to communicate between the user's remote device 135 and the web page associated with the navigation link. The web session may include a web session ID that is assigned to a user ID associated with the user.

After the live agent navigates the user to a particular web page or online form via the navigation link, the live agent can provide explanations about the online form over the phone call. At this point, there are two separate communication channels opened, namely, the phone call on the voice channel (via voice server 115) and the web channel where the user is accessing the web page (via web server 130). In one embodiment, the voice device 120 (e.g., user's phone) and the web device 135 (e.g., the user's computer) are two separate devices operated by the user at the same time.

In another embodiment, the user may be operating one device such as a smart phone that makes the phone call with a phone application and also navigates to the web page with an internet browser application. In both cases, the voice channel and the web channel are still established from two different servers on the back-end and the channels are operated independently from each other. However, the call controller 105 automatically joins the two channels together by linking the user's voice session and the user's web session together.

At block 250, the call controller 105 automatically links the voice session and the web session associated with the user. This may be triggered by a web session being established for a user. In response, the call controller 105 may locate the corresponding voice session ID assigned to the same user from the voice server and/or identify the web session ID of the user from the web server (or vice versa). Once the voice session ID and web session ID are located, the system maps or otherwise assigns the voice session ID and the web session ID together in the session connections 110 (see FIG. 1). As previously described, each voice session established in the voice server 115 may be identified by, for example, a voice session ID and a unique voice identifier that identifies at least the user and/or their voice channel (e.g., user ID, phone number, etc.). Each web session established in the web server 130 is identified by a unique web identifier that identifies at least the user (user ID) and their web channel/session.

Once the two sessions/channels are associated to each other by, for example, assigning/mapping their IDs to each other in the session connections 110, the call controller 105 and other system components can determine which channels are connected that belong to the same user. This also identifies which channels belong to a particular user/customer based on matching the user ID.

In one embodiment, when a web session is established, the call controller 105 is configured to search and identify if a corresponding voice session exists for the same user ID associated with the web session. The web session includes identification information of the user (e.g., user ID). The call controller 105 may obtain the user's identification information from the web session data. Voice session data from the voice server 115 may then be queried and searched to find a matching user ID that has a voice session currently active. If a match is found, then the call controller 105 links the matching voice session ID to the web session ID, which are both associated to the same user ID, in the session connections 110. As a result, the call controller 105 (and other system components) are made aware that a particular user ID has two active channels, which allows data to be communicated and transferred between the two channels.

At block 260, after the user navigates to a web page associated with the navigation link, a bot may be activated to operate with the web page and provide assistance to the user while the user interacts with the web page. As previously explained the bot may be configured to monitor user actions and report the user actions to the call controller 105. Due to the voice session and the web session being connected, the call controller 105 may communicate audio voice responses with the user over the audio voice channel and simultaneously communicate digital data over the web session to the bot and/or web page while the user is interacting with the web page. Thus, while the user is inputting data into or interacting with the web page on the web channel, the call controller 105 can be concurrently talking to the user over the phone call to provide assistance in response to the user actions happening on the web channel.

After the web session is established with the user, the live agent and user may still be connected and communicating on the phone call (voice session). Furthermore, once the user navigates to the web page, the live agent may provide some assurances to the user and let the user know that the bot will assist the user with handling the form to resolve their issue. In one embodiment, once the user agrees or gives approval to work with the bot, the live agent may trigger a disconnect option that disconnects the live agent from the phone call (voice session). In another embodiment, in response to establishing the web session and/or activating/executing the bot to operate with the web page, the call controller 105 may disconnect the live agent from the voice session after some defined time interval. Disconnecting may include putting the voice channel connection of the live agent in a hold status on the phone call (voice session) or completely disconnecting and terminating the live agent from the phone call. In either scenario when the live agent is disconnected from the voice session, the voice session remains open and active with the user, which allows audio responses to be made by the call controller 105 to the user. The user's phone call is not in a hold status at this time.

For example, after the live agent transfers the customer/user to a web page, the live agent can explain that the customer should fill out the associated online form, put the phone call of the live agent on hold, and then the agent will reconnect once the customer completes the online form. Thus, the live agent is no longer actively engaged with the customer. While the live agent is on hold (disconnected), the customer's voice session remains open and any questions asked by the customer are handled by the call controller 105 using NLP as described herein.

The bot may be configured to monitor the progress of the customer filling out the online form. When the form is complete or nearly complete, a completion condition is triggered. The web page may also have a completion button (e.g., a submit button), which when activated by the customer, triggers the completion condition. In response, the bot may send a completion message or alert signal back to the call controller 105. In response, the call controller 105 may generate an alert and/or pass the completion message signal to the live agent alerting the agent to reconnect to the voice session.

In another embodiment, in response to the completion condition that indicates the user has completed interacting with the web page, the system may automatically reconnect the live agent to the voice session with the customer. Reconnecting to the voice session allows the live agent to finalize any remaining issues with the customer. If the live agent was disconnected or put in a hold status, then the system may be configured to generate and transmit a completion message/signal to the live agent. The completion message/signal may indicate that a particular user has completed filling out the online form and requests the live agent to reconnect to the voice session by, for example, selecting a reconnect option on a GUI. The system then reconnects the live agent's device to the voice session.

Overall, the present system improves previous call systems by joining/linking voice sessions to web sessions that are independently established. This allows the call controller 105 to simultaneously monitor and communicate over both channels rather than having multiple components monitor and communicate separately for each channel. Thus, the number of components may be reduced in the call system. The present system also provides advantages to the call system by, for example, disconnecting a live agent from a phone call much earlier in the process of handling a customer phone call. Thus, the amount of time consumed by the live agent on a particular phone call is reduced and allows the live agent to handle more phone calls in a given time period.

Navigation Links Embodiment

With reference to FIG. 3, one embodiment of a method 300 is illustrated that is associated with identifying and generating candidate navigation links to assist the live agent. Method 300 is one embodiment of the actions performed after the voice session is established in block 220 in FIG. 2 and prior to block 230, which involves the system transmitting a navigation link to a remote device associated with the user.

At block 310, in one embodiment, during initial moments of the phone conversation between the customer/user and the live agent during the voice session, a natural language processing (NLP) application may be executed. The NLP application is configured to analyze and understand the conversation/subject matter from the audio voice signals from the voice session. This may include converting the audio voice signals to text data and extracting content from the text data. Based on understanding conversation, the NLP may predict the issue that the user is calling about.

At block 320, based on the predicted issue, the system identifies content in a database that is related to the issue. The system may then identify and retrieve one or more candidate navigation links from the database that are directed to one or more web pages that contain content for resolving the predicted issue. For example, if the customer's is trying to add a second user to their account, the system searches the database for related content (e.g., one or more forms related to adding a user to an account) and retrieves navigation links associated with each form or webpage. These links are called candidate links since the system is predicting which links are potentially relevant to the customer's issue and may resolve the customer's issue.

At block 330, the system generates and displays a list of the one or more candidate navigation links on a computing device associated with the live agent. The list is created including a description of each link and transmitted to the device of the live agent. The list is then displayed in real-time on a graphical user interface (GUI) during the phone call. The list is made with selectable links to allow the live agent to select the link that is most appropriate to the customer issue. The selected link is also referred to as a target navigation link.

At block 340, in response to the live agent selecting a target navigation link from the list, the system prepares the target navigation link for transmission to the remote device associated with the user. For example, an electronic message is generated containing the target navigation link and addressed to a device associated with the customer. The electronic message may be an SMS message pushed to the customer's phone and/or may be an email transmitted to the customer's email address. Upon receipt, the customer's device is navigated to the target navigation link when the customer selects/opens/activates the target navigation link.

Voice-to-Web Form Filling Embodiment

With reference to FIG. 4, one embodiment of a method 400 is illustrated that is associated with connecting an independent voice channel and a web channel and inserting digital data into an interactive form based on voice data. Method 400 is performed by call system 100 of FIG. 1 or similar system, in one embodiment, and allows the data to be transferred between the two connected channels.

At block 410, in response to receiving a phone call from a user, the system establishes a voice session in a first server to communicate audio speech. The voice session is established in a similar manner as described previously.

At block 420, the system connects the voice session to a live agent to communicate with the user via the phone call. This may include identifying and connecting a live agent from a plurality of agents that are not currently active on another phone call.

At block 430, as the user and live agent speak to each other, the system converts the audio speech to text data and extracts a plurality of data components from the text data using natural language processing (NLP). The NLP functions may be performed in a similar manner as described previously.

At block 440, the system causes a remote device associated with the user to navigate to a web page. For example, the web page includes an interactive form associated with a subject matter determined from the text data. This step may include similar actions as block 230 from FIG. 2, including but not limited to, identifying a relevant navigation link based on the user/customer's issue, generating an electronic message containing the navigation link, and transmitting the electronic message to the user's device.

At block 450, in response to the navigation link being activated, the user's remote device is caused to navigate to the web page associated with the link, which includes the interactive form. The system then establishes a web session in a second server to allow the user to interact with the web page via the remote device. These functions may include similar functions as described with block 240 in FIG. 2.

At block 460, the system connects the voice session from the first server to the web session from the second server to allow concurrent communication therebetween. For example, as previously described, the call controller 105 may identify the voice session associated with the user (e.g., a voice session ID) and also identify the web session that is associated with the same user (e.g., a web session ID). The voice session ID and web session ID may then be mapped/assigned to each other in the session connections 110 (see FIG. 1). The two sessions and thus the two channels are joined together in the system as previously described. Thus, the call controller 105 functions as an interconnection that passes communications between both channels for a specific user/customer.

At block 470, with the voice and web sessions connected, functions and communications may then be performed simultaneously between the two sessions that were previously not possible. This includes transferring data between the two sessions (e.g., voice data to web page data, and web page data to voice data). For example, in the voice session, the call controller 105 may generate and transmit automated voice prompts to the user that request data input for a first data field in the interactive form that is in the web session. The automated voice prompt may correspond to a particular data field and/or may be generated by the system based on user actions detected on the interactive form. Thus, actions/events detected in the web session may be transferred to the call controller 105 to cause voice responses in the voice session.

Furthermore, after the voice and web sessions of the user are connected, the user may continue operating with both sessions to resolve their issue with assistance from the call controller 105. As in previous examples, the user may be filling out a form on a web page via the web session and the call controller 105 may provide responses to the user. While this is happening, the agent may be disconnected from the voice session (e.g., put on hold or terminated) to allow the live agent to perform other tasks and/or handled other phone calls.

In another embodiment, the system may initiate and operate an embedded bot with the interactive form in the web session. The embedded bot is configured to operate as previously explained, which includes monitoring user actions, automating input and output to the interactive form, and communicating with the call controller 105.

In one embodiment, the interactive form includes one or more blank data fields, which may receive input data. The embedded bot is configured to monitor user actions and events that occur on the interactive form. When certain detected actions or events occur, the embedded bot may transmit corresponding data back to the call controller 105. Based on the received data, the call controller 105 may generate voice prompts/responses over the phone call (in the voice session) that requests data input for one or more of the blank data fields in the interactive form. The voice prompts/responses may be identified and retrieved from the conversation library 145, which is programmed with responses to particular events/conditions. The call controller 105 may be configured to verbally ask the user to provide an answer to a blank data field based on a location of the user's mouse or cursor on the interactive form.

At block 480, in response to receiving a speech response from the user that responds to the automated voice prompt from the call controller, the speech response is converted to text data. Other NLP functions may be applied to determine which parts are actual data values. Data values are extracted from the text data that correspond to an answer to the particular data field. For example, in a speech response, "My name is John," the data value is "John" which corresponds to an input field "Name." The data values are then transmitted to the web session and inputted into the particular data field in the interactive form in the web session by the embedded bot.

Thus, by joining the two sessions/channels and transferring data from the phone call to the embedded bot operating on the web page, the call controller 105 may communicate voice responses via the voice session to the user and may concurrently interact with the web page via the web session. Thus, the user can continue to communicate over the phone (which the user likely prefers) and the live agent can disconnect from the phone call since the call controller along with the embedded bot takes over interaction.

Accordingly, with the present system, improvements are obtained over single channel systems and over systems that have multiple individual channels. This also helps to reduce call handle time for live agent. As described herein, by joining voice and web channels, an automated response system (e.g., call controller) obtains simultaneous access to both the voice channel and the web channel that are connected to a customer/user. This allows concurrent interaction with the customer/user on both channels and allows data to be collaborated/shared between both channels. As described here, phone calls handled by a live customer service agent may be transferred to the call controller 105, which may also operate with an embedded bot, thereby reducing resources including the amount of time required by the live agent to be on the phone (e.g., the call handle time).

Embedded Bot Embodiments

In one embodiment, the embedded bot may be an executable input/output model. Regarding operations of the bot, in one embodiment, the bot may be configured to monitor user interactions with a web page via a web session. For example, the bot may detect certain events/conditions from the user interactions and its context. One type of event/condition may include detecting an input hesitation from the user interactions. An input field on the web page associated with the input hesitation or other user interactions is also identified. In response to detecting the input hesitation by the bot, the bot may be configured to communicate the detected event/condition to the call controller 105. Based on the type of event/condition, the call controller 105 may determine a corresponding response that has been defined in the conversation library 145 (see FIG. 1).

If the corresponding response is found, the response is converted to voice and a verbal assistance message may be generated and transmitted by the call controller 105 relating to the input field via the audio channel to provide voice assistance to the user.

For example, based on the monitored actions, the bot may detect certain types of actions, for example, when a user hesitates or takes too long while inputting data to a particular input field on the web page. These actions may be determined from monitoring positions of a mouse or cursor on the webpage. The cursor positions typically identify certain input fields or content that are located on the web page in the same positions. Timing of the user actions may indicate whether a user is hesitating on an input field. For example, when the cursor does not move and/or no input is entered for a threshold amount of time (e.g., 5-10 seconds), the user may be hesitating because the user does not understand what the input should be.

Since the two channels are connected for the same user, the call controller 105 may interact and communicate with both channels simultaneously. For example, responsive to certain types of detected user interactions, the call controller 105 may generate and transmit voice responses simultaneously via the voice channel to provide assistance to the user relating to the content of the web page. If the bot detects that the user is hesitating while inputting data into an address field on a form, the bot communicates this event to the call controller 105. The call controller 105 may generate and transmit a voice response such as, "I see you are having trouble with the address field. Please input your home address." In one embodiment, for a particular web page or web form, various responses may be defined and associated with one or more fields on the web page/form or other content on the web page/form. These responses may be maintained in the conversation library 145 or other suitable database.

In one embodiment, the responses in the library 145 are configured to describe what data belongs in a particular input field to help the customer. The call controller 105 may further ask for the input data with a voice response over the voice session (e.g., "What is your name, please"). The customer can verbally provide the input in a voice response over the voice session. The voice response may then be converted to text input and transferred to the web session, and received by the embedded bot. Thus, the voice response is transferred from the voice session to the bot in the web session such that both channels are used in collaboration.

The bot may then automatically insert the text input into the name field via the web session. The call controller 105 may also be programmed to answer questions related to the content of a web page, which may be something other than a fillable form. Such answers are defined and maintained in the conversation library 145.

Thus, the call controller 105 may be configured with responsive actions that are based on what is happening on the website/page (e.g., what the user's actions are doing on the website GUI). This is possible because the system has linked/connected the audio voice channel (phone call, voice session) with the digital web channel (the website, web session). Accordingly, with the present connections, the call controller may collaboratively operate with the user via the voice session and the web session.

With the present call system 100, a live agent on a phone call may disconnect from the phone call more quickly once the customer navigates to a particular web page that assists with resolving the user's issue. This reduces the call handle time for a human agent and the agent is freed up from having to collect basic information from the customer. Instead, the bot is collecting the information from the customer and providing automated assistance via call controller 105 over the voice session and web session simultaneously.

NLP, Voice-to-Form Embodiment

In one embodiment, the present call control system 100 may obtain initial data from a phone call (voice session) that may then be transferred to a web session for automatic input into an online form.

As previously stated, a speech recognition or natural language processing (NLP) application may be used in conjunction with the call system. A voice session may be recorded in real-time, and the audio is converted to text data with, for example, a speech-to-text conversion function. The NPL may then analyze the text, recognize what the text is, and extract certain pieces of data that are identified as corresponding to one or more known data fields. The extracted data may include, but are not limited to, the customer's first and last name, home address, email address, reason for the phone call, etc.

Subsequently, once a web session is established for the customer and the customer navigates to an online form, the extracted data may be transferred to the web session. The bot may then automatically input the extracted data into corresponding input fields within the online form. In this manner, portions of the online form are filled in based on the voice conversation without the customer manually inputting all the data.

In another embodiment, by analyzing the phone conversation between a customer and a call center agent, the NLP application can determine the context and/or subject matter of the conversation. Based on the context and/or subject matter, the system may predict what type of issue the customer is calling about and perform actions accordingly. For example, based on the predicted issue, the present system may identify and provide tools, tips, and/or functionality (that are accessible on a user interface) that help both the agent and customer to be more productive to resolve the issue. This in turn helps complete the phone call more quickly and reduces the overall call time.

In another embodiment, the NLP may be configured to perform real time sentiment analysis. For example, the sentiment of both the live agent and the customer may be determined from the conversation. Levels of sentiment or emotion may also be calculated such as level of anger, empathy, etc. This may be recorded and stored to give feedback to the live agent for training purposes. The system may also generate pop-up windows in real-time on the live agent's device with suggestions for responding to certain emotions that are detected.

In one embodiment, if the detected sentiment on a call escalates above a threshold level (e.g., the customer is angry over some threshold), the system can send an alert message to a supervisor to get involved. The system may provide a link to allow the supervisor's device to automatically connect to the corresponding voice session.

Cloud or Enterprise Embodiments

In one embodiment, the call system 100 is a computing/ data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment, the call system 100 is a centralized server-side application that provides at least the functions disclosed herein and that is accessed by many users via computing devices/terminals communicating with the call system 100 (functioning as the server) over a computer network.

In one embodiment, one or more of the components described herein are configured as program modules stored in a non-transitory computer readable medium. The program modules are configured with stored instructions that when executed by at least a processor cause the computing device to perform the corresponding function(s) as described herein.

Computing Device Embodiment

Figure 5:
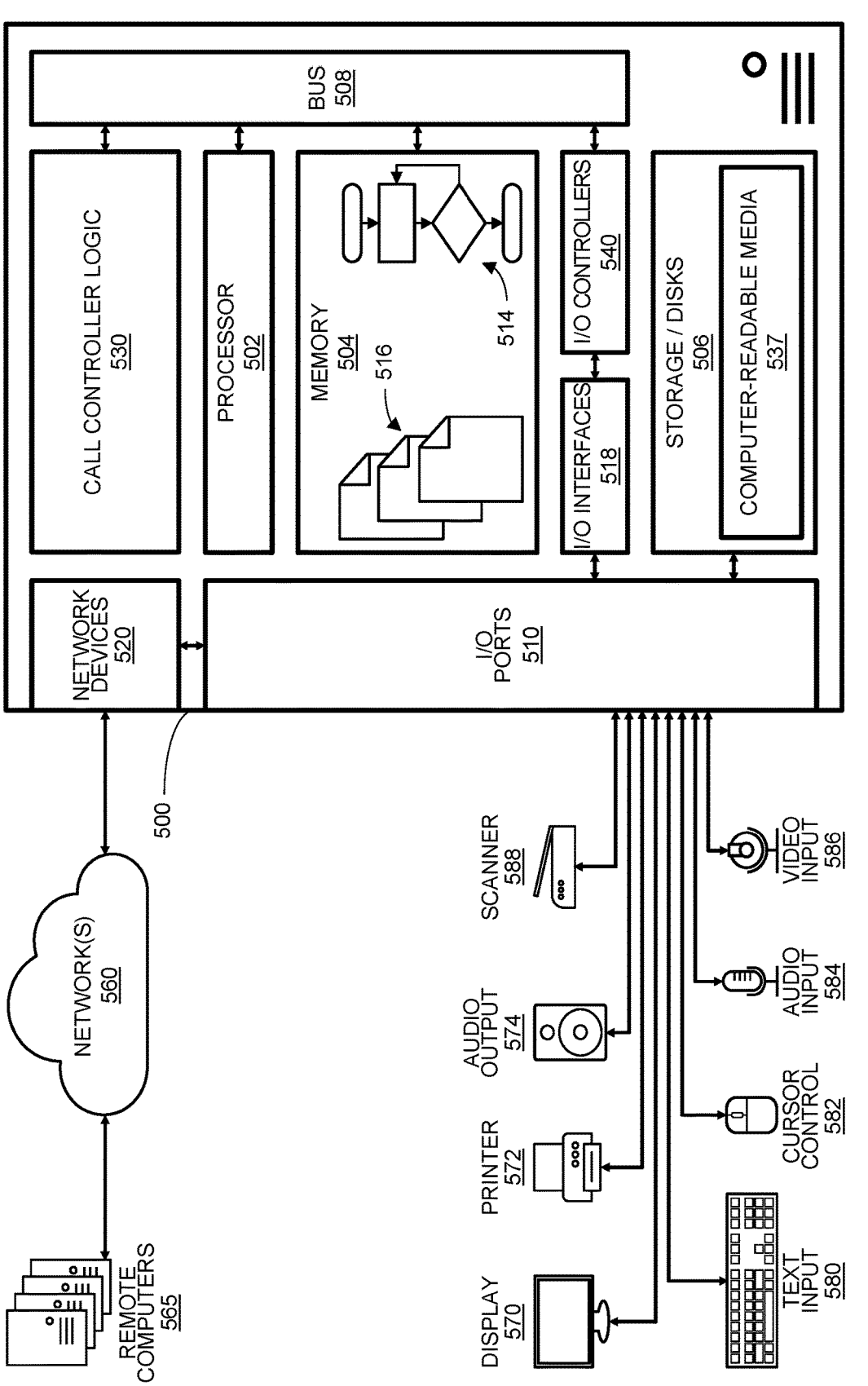
FIG. 5 illustrates an embodiment of a computing system configured with the example systems and/or methods disclosed.

FIG. 5 illustrates an example computing device that is configured and/or programmed as a special purpose computing device with one or more of the example systems and methods described herein, and/or equivalents. The example computing device may be a computer 500 that includes at least one hardware processor 502, a memory 504, and input/output ports 510 operably connected by a bus 508. In one example, the computer 500 may include call controller logic 530 configured to facilitate handling phone calls and controlling connections between phone calls on a voice channel and web page access on a web channel similar to the call control system 100 shown in FIGS. 1 and/or associated processes in FIGS. 2-4 and their equivalents.

In different examples, the logic 530 may be implemented in hardware, a non-transitory computer-readable medium 537 with stored instructions, firmware, and/or combinations thereof. While the logic 530 is illustrated as a hardware component attached to the bus 508, it is to be appreciated that in other embodiments, the logic 530 could be implemented in the processor 502, stored in memory 504, or stored in disk 506.

In one embodiment, logic 530 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform the functions of the call control system 100. The means may also be implemented as stored computer executable instructions that are presented to computer 500 as data 516 that are temporarily stored in memory 504 and then executed by processor 502.

Logic 530 may also provide means (e.g., hardware, non-transitory computer-readable medium that stores executable instructions, firmware) for performing the functions of call the control system 100.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A storage disk 506 may be operably connected to the computer 500 via, for example, an input/output (I/O) interface (e.g., card, device) 518 and an input/output port 510 that are controlled by at least an input/output (I/O) controller 540. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The computer 500 may interact with, control, and/or be controlled by input/output (I/O) devices via the input/output (I/O) controller 540, the I/O interfaces 518, and the input/output ports 510. Input/output devices may include, for example, one or more displays 570, printers 572 (such as inkjet, laser, or 3D printers), audio output devices 574 (such as speakers or headphones), text input devices 580 (such as keyboards), cursor control devices 582 for pointing and selection inputs (such as mice, trackballs, touch screens, joysticks, pointing sticks, electronic styluses, electronic pen tablets), audio input devices 584 (such as microphones or external audio players), video input devices 586 (such as video and still cameras, or external video players), image scanners 588, video cards (not shown), disks 506, network devices 520, and so on. The input/output ports 510 may include, for example, serial ports, parallel ports, and USB ports.

The computer 500 can operate in a network environment and thus may be connected to the network devices 520 via the I/O interfaces 518, and/or the I/O ports 510. Through the network devices 520, the computer 500 may interact with a network 560. Through the network, the computer 500 may be logically connected to remote computers 565. Networks with which the computer 500 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is stored instructions of an configured with computer executable algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims and their equivalents.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method, the method comprising:

receiving, by a voice server, a phone call from a user;

establishing a voice session to communicate over an audio channel, wherein a live agent communicates audio voice signals with the user over the audio channel;

in response to identifying an issue from the user, transmitting a navigation link to a remote device associated with the user, wherein the navigation link, when activated, navigates a browser on the remote device to a web page associated with the issue;

in response to the user navigating to the web page via the navigation link, establishing a web session in a web server that includes a web channel to communicate between the remote device and the web page;

in response to the web session being established, linking, by a call controller, the voice session and the web session associated with the user;

activating a bot to operate with the web page and monitor at least user actions on the web page, wherein the bot communicates one or more user actions to the call controller; and generating and transmitting, by the call controller, audio voice signals over the voice session based on at least the one or more user actions from the web session, and simultaneously communicating digital data over the web session to the web page while the user is interacting with the web page.

2. The method of claim 1, wherein identifying the issue from the user and transmitting the navigation link further comprises:

analyzing the audio voice signals from the voice session with natural language processing to predict the issue from the user;

based on the predicted issue, retrieving from a database, one or more candidate navigation links associated with one or more web pages that contain content for resolving the predicted issue;

generating and displaying a list of the one or more candidate navigation links on a computing device associated with the live agent; and in response to the live agent selecting a target navigation link from the list, transmitting the target navigation link to the remote device associated with the user.

3. The method of claim 2, wherein analyzing the audio voice signals further comprises:

converting the audio voice signals to text data;

extracting content from the text data to predict the issue from the user;

based on at least the predicted issue, identifying candidate forms that are associated with the predicted issue; and retrieving the one or more candidate navigation links corresponding to each of the candidate forms.

4. The method of claim 1, wherein the web page associated with the web session includes an interactive form, and wherein the method further comprises:

receiving voice input from the user via the voice session;

converting the voice input to text input;

transferring, by the call controller, the text input from the voice session to the bot in the web session; and automatically, by the bot, inserting the text input into data fields in the interactive form.

5. The method of claim 1, further comprising:

in response to activating the bot to operate with the web page, disconnecting the live agent from the voice session while the voice session remains open for communicating with the user; and in response to a completion condition that indicates the user has completed interacting with the web page, reconnecting the live agent to the voice session with the user.

6. The method of claim 1, wherein the navigation link includes a pre-authentication of the user which allows the web server to automatically authenticate the user and log into an account assigned to the user.

7. The method of claim 1, further comprising:

based on monitoring the user actions on the web page by the bot, detecting an input hesitation from the user actions and identifying an input field on the web page associated with the user actions;

transmitting, by the bot, data associated with the input hesitation and the input field to the call controller; and generating and transmitting, by the call controller, a verbal assistance message relating to the input field via the audio channel.

8. A method comprising:

in response to receiving a phone call over a network from a user, establishing a voice session in a first server to communicate audio speech;

connecting the voice session to a live agent to communicate with the user via the phone call;

converting the audio speech to text data and extracting a plurality of data components from the text data using natural language processing;

causing a remote device associated with the user to navigate to a web page, wherein the web page includes an interactive form associated with a subject matter determined from the text data;

establishing a web session in a second server to allow the user to interact with the web page via the remote device;

connecting, by a call controller, the voice session from the first server to the web session from the second server to allow concurrent communication therebetween;

in the voice session, generating and transmitting voice prompts by the call controller, that request data input for a first data field in the interactive form; and in the web session, in response to receiving a speech response from the user from the voice session, extracting data values from the speech response and transferring the data values into the first data field in the interactive form via the web session.

9. The method of claim 8, further comprising:

operating an embedded bot on the web page, wherein the embedded bot detects user actions on the web page via the web session;

transferring user data representing the user actions from the web session to the call controller; and generating a voice response based on the user data and transmitting the voice response via the voice session to the user.

10. The method of claim 8, further comprising:

identifying the plurality of data components from the text data of the converted audio speech received via the phone call;

associating one or more components of the plurality of data components to one or more associated input fields in the interactive form that likely correspond to the one or more components; and automatically inputting the one or more components into the associated input fields in the interactive form via the web session.

11. The method of claim 8, further comprising:

in response to establishing the web session, disconnecting the live agent from the voice session; and in response to a completion condition that indicates the user has completed interacting with the interactive form, reconnecting the live agent to the voice session with the user.

12. The method of claim 8, wherein connecting the voice session from the first server to the web session from the second server comprises:

identifying a voice session identifier associated with the user and the corresponding voice session established for the user;

identifying a web session identifier associated with the user and the corresponding web session established for the user; and joining the voice session identifier and the web session identifier in a session connection that maps the voice session and the web session to each other.

13. The method of claim 8, wherein causing a remote device associated with the user to navigate to a web page comprises:

determining a subject matter associated with the text data from the audio speech;

identifying and retrieving one or more candidate navigation links from a database that are directed to one or more web pages that contain content associated with the subject matter;

generating and displaying, on a graphical user interface, a list of the one or more candidate navigation links on a computing device associated with the live agent; and in response to a selection of a target navigation link from the list, generating an electronic message containing the target navigation link and transmitting the electronic message to the remote device associated with the user; and wherein activating the target navigation link from the remote device, causes the remote device associated with the user to navigate to a web page.

14. The method of claim 8, wherein after connecting the voice session to the web session, the call controller communicates audio voice signals with the user over the voice session and simultaneously communicates digital data over the web session to the interactive form while the user is viewing and interacting with the interactive form.

15. A computing system, comprising:

at least one processor connected to at least one memory;

a non-transitory computer readable medium including instructions stored thereon that when executed by at least the processor cause the processor to:

concurrently connect a voice channel to a web channel in a server with a session connection, wherein the voice channel is established from a phone call from a first user device associated with a user and the web channel is established from a browser of a second user device associated with the user navigating to a web page;

wherein a navigation link is transmitted to the second user device, wherein the navigation link, when activated, navigates the browser to the web page;

activate a bot to monitor user interactions on the web page via the web channel; and generate voice responses via the voice channel based on the user interactions from the web channel to provide assistance to the user relating to content of the web page.

16. The computing system of claim 15, wherein the instructions further comprise instructions that when executed by at least the processor cause the processor to:

connect an agent device associated with a live agent to the voice channel of the phone call;

in response to connecting the voice channel and the web channel together, disconnect the agent device from the voice channel; and in response to a completion condition that indicates the user has completed interacting with the web page, reconnect the agent device to the voice channel with the user.

17. The computing system of claim 15, wherein the instructions for connecting the voice channel to the web channel in the server comprises instructions that when executed by at least the processor cause the processor to:

identify a voice session identifier associated with the user and the corresponding voice channel established with the first user device;

identify a web session identifier associated with the user and the corresponding web channel established with the second user device; and join the voice session identifier and the web session identifier in a session connection that maps the voice session identifier and the web session identifier to each other.

18. The computing system of claim 15, further comprising instructions that when executed by at least the processor cause the processor to:

analyze audio voice signals from the voice channel with natural language processing to predict an issue from the user;

based on the predicted issue, retrieve from a database, one or more candidate navigation links associated with one or more web pages that contain content for resolving the predicted issue;

generate and display a list of the one or more candidate navigation links on a computing device associated with a live agent, wherein the computing device is connected to the voice channel with the user; and in response to the live agent selecting a target navigation link from the list, transmit the target navigation link to the second user device associated with the user.

19. The computing system of claim 15, further comprising instructions that when executed by at least the processor cause the processor to:

convert audio voice signals from the voice channel to text data;

identify a plurality of data components from the text data;

associate one or more components of the plurality of data components to one or more associated input fields in an interactive form that likely corresponds to the one or more components; and automatically input the one or more components into the associated input fields in the interactive form via the web channel.

20. The computing system of claim 15, wherein based on the session connection of the concurrently connected voice channel and the web channel:

a call controller is configured to communicate audio voice signals with the user over the voice channel and simultaneously communicate digital data over the web channel to an interactive form while the user is viewing and interacting with the web page.

\*   \*   \*   \*   \*